United States Patent [19]

McCullough et al.

[11] 3,877,646

[45] Apr. 15, 1975

[54] COMPACT THRUST NOZZLE FOR ROCKETS

[75] Inventors: Edward E. McCullough; Robert W. Bambrick, both of Brigham City; Richard C. Laramee, Ogden, all of Utah

[73] Assignee: Thiokol Chemical Corporation, Bristol, Pa.

[22] Filed: Jan. 7, 1974

[21] Appl. No.: 431,468

[52] U.S. Cl. ............................................ 239/265.19
[51] Int. Cl. ............................................ B64c 15/00
[58] Field of Search..... 239/265.19, 265.33, 265.35, 239/265.37, 265.25, 127.1; 60/230, 232

[56] References Cited
UNITED STATES PATENTS

| | | | |
|---|---|---|---|
| 3,130,544 | 4/1964 | Penza | 60/232 X |
| 3,235,184 | 2/1966 | Kalil et al. | 239/265.35 |
| 3,258,915 | 7/1966 | Goldberg | 239/265.35 X |
| 3,280,563 | 10/1966 | Bowersett | 60/232 |
| 3,504,903 | 4/1970 | Irwin | 239/265.35 X |
| 3,659,789 | 5/1972 | Schultz | 239/265.35 X |
| 3,726,480 | 4/1973 | Miltenberger | 239/265.19 |

*Primary Examiner*—M. Henson Wood, Jr.
*Assistant Examiner*—John J. Love
*Attorney, Agent, or Firm*—Edward E. McCullough

[57] ABSTRACT

A fixed convergent-divergent rocket nozzle has a movable throat section seated in an annular recess in the nozzle and retained therein at its forward end by a flexible bearing. The flexible bearing is constructed of alternate layers of rigid material and elastomer, stacked and bonded together, and conforming to concentric spherical surfaces, so that the throat section may be rotated about a fixed point. Actuators for moving the throat section bear upon it radially from their mounted positions in the nozzle. The throat section is greatly diminished in weight by being made of thin-walled material supported on its outside by ribs that also function as radiating fins to avoid heat buildup in the throat section. The air space surrounding the throat section is open at the downstream edge thereof to the propulsive gases of the rocket further to promote thermal equilibrium of all parts of the throat section, thereby avoiding the possibility of cracking due to differential thermal expansion of inner and outer surfaces of the throat. This air space, together with an annular space on the downstream side of the flexible bearing that is open to the combustion chamber of the rocket, also promotes a pressure balance of the throat member against the blowout load by permitting pressure on surfaces opposite those exposed to the blowout load. Hence, very little energy is required to move the throat member; and actuators therefor may be of minimal size and weight.

4 Claims, 2 Drawing Figures

COMPACT THRUST NOZZLE FOR ROCKETS

The invention described herein was made in the course of or under contract F04611-68-C-0004 with the U.S. Air Force.

CROSS REFERENCE TO RELATED APPLICATIONS

The subject matter of the present invention is related in principle to another application owned by the same assignee of entire rights: "Thrust Nozzle for Rockets" Ser. No. 592,209 by S. D. Schultz, filed Nov. 4, 1966, now U.S. Pat. No. 3,659,789.

BACKGROUND OF THE INVENTION

This invention relates to thrust nozzles for rockets. More specifically, it relates to such nozzles having compact means of steering a rocket that alter the direction of thrust with a rotatable throat member rather than by moving the entire nozzle.

A continuing objective of rocket technology is to maximize the mass of propellant relative to that of inert parts of the rocket. By minimizing the mass of the inert parts of the rocket, both its range and the possible payload may be increased. As a means of decreasing the weight and bulk of the inert parts of the rocket, a number of ideas have been advanced for decreasing the size of mechanisms for steering the rocket. Among such ideas are those in which thrust vector control of the rocket is effected simply by rotating a movable throat member rather than rotating the entire rocket nozzle. This generally requires fewer moving parts and less energy to move them, hence smaller actuators. U.S. Pat. No. 3,659,789 to Schultz shows a movable throat section in a fixed convergent-divergent nozzle that is essentially a solid spherical body having a venturi orifice therethrough. It is sealed fore and aft relative to the nozzle member in which it is seated and has spherical surfaces that require fairly close tolerances with matching surfaces in the recess in which it is seated. Hence, although it was an advance in the art at the time of its conception, it is fairly heavy and expensive to manufacture. U.S. Pat. No. 3,258,915 to Goldberg shows a throat section in an otherwise fixed thrust nozzle that is movable laterally in translatory motion to effect steering of the rocket by creating a small moment arm about the center of mass thereof. Since the moment arm is necessarily small, a rocket steered by this means cannot execute sharp turns but can only be steered through wide arcs.

SUMMARY OF THE INVENTION

The present invention, which constitutes an advance over the prior art is highly responsive, lightweight, steering mechanisms for rockets. The movable throat member of the present invention is a thin walled annulus of refractory material supported at its forward end by a flexible bearing in an annular recess of a fixed, convergent-divergent rocket nozzle. The throat member is strengthened by ribs that also function as radiating fins. Hence, heat from the propulsive gases is rapidly transferred through the throat member and is dissipated in the air space surrounding it by radiation and convection, so that there can be no heat buildup in the throat member. Thermal equilibrium of all parts of the throat member is further promoted by the fact that the space surrounding it is open, at the downstream edge of the throat member, to the propulsive gases of the rocket. Since the space surrounding the throat member is essentially a dead air space, being closed at its forward end by the flexible bearing, thermal equilibrium is effected by convection and by the pumping action that results from moving the throat member. Also, since the opening to this space is downstream of the throat, the solid, erosive, high velocity particles of aluminum oxide, etc., that are characteristic combustion products of solid propellants, tend to by-pass the opening to this space or at least to enter it at such low velocities that their erosiveness is nullified. Hence, the actuator arms that must move through this space to rotate the throat member are protected from erosion by the flexible bearing, which holds the throat member and prevents direct entry of solid particles into the space surrounding it.

Refractory materials that are suitable for the very high temperature, erosive environment of a typical solid propellant rocket throat are sometimes brittle and have a fairly low rate of thermal conductivity. Hence, there tends to be a considerable temperature difference between the inside and outside surfaces of such a throat section. This promotes a differential expansion of the surfaces and possible cracking of the throat member. In the present invention, the thin walls of the throat member promote rapid heat transfer therethrough, and the ribs that support it function as radiating fins to dissipate the heat energy into the air space surrounding the throat member. This is possible because the gases in this space are cooler, having much less energy, than the high velocity gases passing through the throat orifice.

Objects of the invention are to provide apparatus that is compact, efficient, light in weight, and reliable for steering a rocket.

An important feature of the invention is that the movable throat member is made of very thin walled, refractory material that is strengthened by ribs that also function as radiating fins to cool the throat member. Other features are that the invention is easy and inexpensive to make and does not require close tolerances in the dimensions of adjacent parts.

Another important feature of the invention is that a space is provided on the side of the flexible bearing and mounting flange of the throat member opposite the rocket combustion chamber. This space, being open to the combustion chamber, allows gases thereof to exert a counterpressure on the flexible bearing and throat member to balance a part of the blow-out load impressed thereon by the gases. This counterpressure is augmented by the gases surrounding the throat member. This diminishes the net force exerted on the throat member by the propulsive gases; and, hence, its resistance to the actuators, so that they may be of minimal size and weight.

Other objects and advantages of the invention may be noted as the following detailed description is read with reference to the accompanying drawings.

DESCRIPTION OF THE PREFERRED EMBODIMENTS

Figure 1:
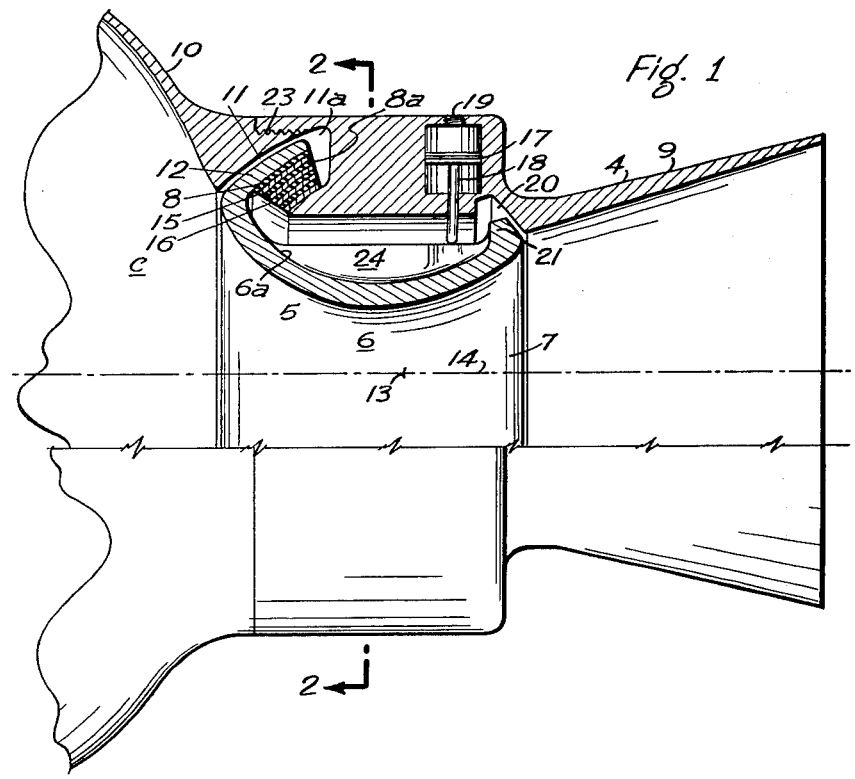
FIG. 1 is a longitudinal, partial section of the invention.
Figure 2:
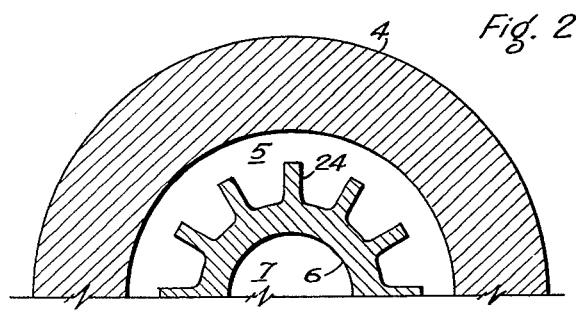
FIG. 2 is a half cross section thereof.

The preferred embodiment of the invention shown in the Figures has a fixed, convergent-divergent nozzle member 4 having an annular recess 5 at the juncture of convergence and divergence. An annular throat member 6 forming a venturi orifice 7 is loosely seated in the recess 5 and is held therein by a flexible bearing 8. The internal surface of the throat member 6 is contoured relative to the exit cone 9 of the nozzle member 4 and to the rocket case 10 thereof to optimize smoothness of gas flow therethrough.

The annular recess 5 has deeper recesses fore and aft. The forward recess 11 accomodates an annular, outwardly extending flange 12 on the forward end of the throat member 6 and the flexible bearing 8 to which it is bonded. This bearing 8 is bonded to the side of the recess 11. A space 11a is left in the recess 11 on the side of the bearing 8 and flange 12 opposite the combustion chamber. This space 11a is open to the combustion chamber C; so that the pressure thereof may be impressed on the bearing and flange surface 8a to balance a part of the blow-out load on the throat member 6.

The flange 12 conforms to a spherical surface about a point of rotation 13, which is an imaginary point on the axis 14 of the rocket about which the throat member 6 may rotate. The flexible bearing 8 is made of rigid laminae 15 stacked alternately with elastomeric laminae 16 and bonded together. The laminae 15 and 16 all conform to spherical surfaces concentric about the point of rotation 13, so that the throat member 6 can only rotate about that point and about axes perpendicular to that of the rocket. The bearing 8 may be any one of various other forms of universal joint, such as an annular piece of rubber. However, the bearing described is preferred because it causes the throat member 6 to rotate about a fixed point; and, hence, affords greater control over the direction of the rocket's flight.

Movement of the throat member 6 is effected by four small, radially oriented, single action, hydraulic actuators 17, equally spaced circumferentially about the throat member 6, and each having a driving arm 18 that bears against the throat member 6. The actuators 17 may be built into the wall of the nozzle member 4 for compactness as shown, or they may be any suitable type of commercially available hydraulic or pneumatic actuator mounted on the exterior of the nozzle 4 with their driving arms 18 extending in sealed relationship through holes therein to contact the throat member 6. As shown, pressurizing fluid may be introduced into each actuator through a threaded duct 19, in which hydraulic fittings, not shown, may be engaged.

The aft recess 20 in the annular recess 5 loosely accomodates the short, outwardly extending flange 21 on the aft portion of the throat member 6 that minimizes gaps between the throat member 6 and the exit cone 9 of the nozzle member 4 as the throat member 6 is rotated. However, a small space is left between this flange and the aft side of the recess 20 so that the air space surrounding the throat member 6 is open to the propulsive gases passing therethrough.

The nozzle member 4 may be attached to the rocket case 10 in any of the conventional ways. A threaded coupling 23 is shown in the drawing for this purpose.

The throat member 6 may be made of any of the materials commonly known to be suitable for use as a rocket throat, such as dense graphite, tungsten, or any of various composite carbonaceous materials. As shown in the Figures, this throat member 6 is a thin walled annulus that forms a venturi orifice 7 and is strengthened by external ribs 24. The flexible bearing 8 may be made of steel or graphite laminae alternately stacked with rubber laminae, particularly a high temperature rubber such as Buna-N rubber.

In operation, hot gases produced by combustion of propellant in the rocket are expelled through the nozzle 4 to create thrust, which may be directed as desired to steer the rocket by rotating the throat member 6. This is accomplished by the actuators 17 in response to signals from guidance means not shown.

It is important to note that the arrangement of the flange 12 and the flexible bearing 8 is such that they cooperate to perform several functions simultaneously: (1) The flange 12 protects the bearing 8 from direct impingement by hot, erosive, propulsive gases from the rocket; (2) It places the bearing 8 under compression, thereby taking advantage of its greatest strength; (3) The bearing 8 not only functions as such to support the throat member 6, but it also functions as a seal between the throat member 6 and the nozzle 4 to prevent the high velocity hot gas from entering this space directly and possibly damaging the actuators 17 by erosion because of the hard, abrasive particles it contains; and (4) As described above, a balancing pressure occurs in the forward recess 11.

It is important to note that the propulsive gases are allowed to enter the space surrounding the throat member 6 through the loose tolerance between the aft flange 21 and its recess 20; but since this space surrounding the throat 6 is a dead air space, such gases enter at relatively low velocities. This promotes thermal equilibrium between the inner and outer surfaces of the throat member 6 to protect it from thermal shock and possible fracture. Further, the ribs 24 of the throat member 6 may act as radiating fins to cool the throat member 6 by radiation and convection, since the gases surrounding the throat member 6 are at a lower energy level, hence cooler, than those passing through the venturi orifice.

It is also important to note that the propulsive gases in the space surrounding the throat member 6 may bear against the surface 6a thereof to counter the blowout load, on the throat member 6. This counterpressure, together with that on the bearing surface 8a, as described above, can balance the blowout load on the throat member 6. This greatly minimizes the force necessary to move the throat member 6, so that the actuators 17 may be of minimal size and weight.

Another important feature of the invention is that, when the threaded coupling 23 is disengaged, all parts of the rocket nozzle are easily accessible. This promotes both ease of manufacture and of repair.

An invention has been described that advances the art of rocket technology; and, although the preferred embodiment has been described specifically with regard to details, it should be noted that many such details may be altered without departing from the scope of the invention as it is defined in the following claims.

The invention claimed is:

1. A thrust nozzle for rockets comprising:
   an annular, convergent-divergent nozzle member having an annular recess at the juncture of convergence and divergence thereof;
   a thin-walled annular throat member forming a venturi orifice seated in the recess with space for movement of the throat member therein, a small space also being provided between the downstream end of the throat member and the nozzle member so that the space surrounding the throat member is open to the propulsive gases of the rocket to promote thermal equilibrium in the throat member;

thin, external ribs on the throat member to support the thin structure thereof and also to function as heat radiating fins to cool the throat member;

annular flexible bearing means attaching and sealing the throat member at its forward end portion to the nozzle member so that propulsive gases from the rocket may not enter the space surrounding the throat member directly; and actuating means, having a driving arm, mounted to the nozzle member so that the driving arm may bear against the annular throat member for rotation thereof about an axis perpendicular to that of the rocket.

2. The nozzle of claim 1 wherein the rotatable throat member has an outwardly extending flange on its forward end that substantially conforms to a spherical surface about a point of rotation on the axis of the rocket, about which point the throat section may rotate; and wherein the flexible bearing means is bonded to the aft side of the flange and comprises laminae of elastomer and rigid material alternately stacked and bonded together, the laminae also conforming to spherical surfaces concentric about the point of rotation so that the throat member may be made to rotate about that point by the actuating means.

3. The nozzle of claim 1 wherein the actuating means is a plurality of radially oriented, fluid operated actuators whereby the throat member may be rotated about any axis perpendicular to that of the rocket to direct the thrust thereof.

4. The thrust nozzle of claim 1 wherein the throat member is made of graphite.

* * * * *